(12) United States Patent
Banks (10) Patent No.: US 11,879,510 B2
(45) Date of Patent: Jan. 23, 2024

(54) DRUM BRAKE CAMSHAFT FORMED WITH ENGINEERED CORE

(71) Applicant: Bendix Spicer Foundation Brake LLC, Elyria, OH (US)

(72) Inventor: Daniel E. Banks, Climax, MI (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 642 days.

(21) Appl. No.: 16/798,504

(22) Filed: Feb. 24, 2020

(65) Prior Publication Data

US 2021/0262537 A1    Aug. 26, 2021

(51) Int. Cl.
 *F16D 51/22*  (2006.01)
 *B33Y 10/00*  (2015.01)
 *B33Y 80/00*  (2015.01)

(52) U.S. Cl.
 CPC .............. *F16D 51/22* (2013.01); *B33Y 10/00* (2014.12); *B33Y 80/00* (2014.12); *F16D 2200/0082* (2013.01); *F16D 2250/0069* (2013.01)

(58) Field of Classification Search
 CPC ............. F16D 51/22; F16D 2200/0082; F16D 2250/0069; F16D 2051/001; F16D 2125/30; F16D 2250/00; B33Y 10/00; B33Y 80/00
 See application file for complete search history.

(56) References Cited

U.S. PATENT DOCUMENTS

| | | | |
|---|---|---|---|
| 2,781,868 A * | 2/1957 | House | ..................... F16D 51/22 74/569 |
| 4,277,969 A | 7/1981 | Simon | |
| 4,730,581 A | 3/1988 | Fujita et al. | |
| 5,213,250 A | 5/1993 | Simon | |
| 5,259,268 A | 11/1993 | Ebbinghaus et al. | |

(Continued)

FOREIGN PATENT DOCUMENTS

| | | |
|---|---|---|
| CN | 204647204 U | 9/2015 |
| CN | 208900514 U | 5/2019 |

(Continued)

OTHER PUBLICATIONS

Machine Translation of DE 19710848 (Year: 1998).*

(Continued)

*Primary Examiner* — Jacob T Minskey
*Assistant Examiner* — Caroline Beha
(74) *Attorney, Agent, or Firm* — Reising Ethington P.C.

(57) ABSTRACT

A method of manufacturing a camshaft for a drum brake includes designing a tubular camshaft and thereafter forming the camshaft as a unitary body through, for example, an additive manufacturing process. The camshaft is designed with a first end portion configured for coupling to a brake actuator, a second end portion defining a cam configured to engage cam followers coupled to first and second brake shoes, rotation of the cam causing the first and second brake shoes to move between positions of engagement and disengagement with an associated braking surface, and an intermediate portion disposed between the first and second end portions. A wall thickness of at least one of the end portions and the intermediate portion is configured to achieve at least one of a predetermined torsional stiffness in the camshaft and vibration damping in the camshaft at a selected frequency.

4 Claims, 4 Drawing Sheets

(56) References Cited

U.S. PATENT DOCUMENTS

| | | | |
|---|---|---|---|
| 5,337,476 A * | 8/1994 | Orsini, Jr. | B21K 1/12 29/523 |
| 6,213,264 B1 * | 4/2001 | Walker | F16J 15/3264 188/341 |
| 8,245,734 B2 | 8/2012 | Jahani et al. | |
| 8,534,252 B2 | 9/2013 | Clever et al. | |
| 9,599,178 B2 | 3/2017 | Mitts et al. | |
| 2002/0043089 A1 | 4/2002 | Reiche et al. | |
| 2009/0255492 A1 * | 10/2009 | Clever | B21D 39/20 123/90.6 |
| 2014/0360828 A1 | 12/2014 | Mitts et al. | |
| 2019/0118240 A1 * | 4/2019 | Lampert | B21D 53/845 |

FOREIGN PATENT DOCUMENTS

| | | |
|---|---|---|
| DE | 197 10 848 A1 | 9/1998 |
| DE | 102007053551 A1 | 5/2009 |
| EP | 0 258 625 A2 | 3/1988 |
| EP | 0324499 B1 | 5/1991 |
| EP | 1071526 B1 | 6/2002 |
| JP | S61-236965 A | 10/1986 |
| WO | 1998/0041339 A1 | 9/1998 |

OTHER PUBLICATIONS

English (Machine) Translation of DE 10 2007 053 551 A1.
English (Machine) Translation of EP 0324499 B1.
English Abstract of EP 1071526 B1.
English Abstract of JP S61-236965 A.
English Abstract of WO 1998/0041339 A1.
"Hollow Transmission Shaft for Double-Clutch Transmission (DCT)," Hirschvogel Automotive Group, (https://www.hirschvogel.com/en/products/transmission/hollow-transmission-shaft-dct).
Sathishkumar A., et al., "Design and Analysis of a Camshaft by Using 3D Printing Technology," 5 Intl. Journal for Research in Applied Science and Engineering Technology No. IV pp. 411-416 (Apr. 2017).
Results of Partial International Search and Provisional Opinion issued in corresponding International (PCT) Patent Application No. PCT/US2021/018446 (dated May 11, 2021).

* cited by examiner

DRUM BRAKE CAMSHAFT FORMED WITH ENGINEERED CORE

BACKGROUND OF THE INVENTION a. Field of the Invention

This invention relates to vehicle brakes. In particular, the invention relates to a method for manufacturing a camshaft for a drum brake having a unitary, tubular body with the wall thickness of one or more portions of the camshaft configured to achieve at least one of a predetermined torsional stiffness in the camshaft and vibration damping in the camshaft at a selected frequency.

b. Background Art

In a conventional vehicle drum brake, a drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam to move the brake shoes between positions of engagement and disengagement with the braking surface of the brake drum. The cam is supported at one end of a camshaft. Rotation of the camshaft is controlled by a pneumatic brake actuator acting through a slack adjuster mounted on the opposite end of the camshaft relative to the cam. The slack adjuster translates linear motion of a pushrod extending from the brake actuator into rotational movement of the camshaft to control the position of the camshaft and cam and to adjust the position to account for brake lining wear.

Many conventional camshafts have a solid core (i.e., are non-tubular) and are relatively heavy. Camshafts that are tubular often have a constant inner diameter for ease of manufacture and fail to optimize the camshaft for reduced weight. In camshafts in which the inner diameter varies, the focus has been on establishing sufficient thickness in areas that carry loads to provide sufficient strength as opposed to minimizing thickness in non-load bearing areas to reduce weight. Further, conventional camshaft designs have failed to recognize the potential to vary wall thickness as a means for establishing a predetermined torsional stiffness in the camshaft and/or as a means to dampen vibrations in the camshaft at selected frequencies.

The inventor herein has recognized a need for a method of manufacturing a camshaft for a drum brake that will reduce one or more of the above-identified deficiencies and/or provide improved performance.

BRIEF SUMMARY OF THE INVENTION

This invention relates to a method of manufacturing a camshaft for a drum brake. In particular, the invention relates to a method for manufacturing a camshaft for a drum brake having a unitary, tubular body with the wall thickness of one or more portions of the camshaft configured to achieve at least one of a predetermined torsional stiffness in the camshaft and vibration damping in the camshaft at a selected frequency.

A method of manufacturing a camshaft for a drum brake in accordance with one embodiment includes designing a tubular camshaft. The camshaft includes a first end portion configured for coupling to a brake actuator. The camshaft also includes a second end portion defining a cam configured to engage cam followers coupled to first and second brake shoes, rotation of the cam causing the first and second brake shoes to move between positions of engagement and disengagement with an associated braking surface. The camshaft further includes an intermediate portion disposed between the first and second end portions. A wall thickness of at least one of the first and second end portions and the intermediate portion is configured to achieve at least one of a predetermined torsional stiffness in the camshaft and vibration damping in the camshaft at a selected frequency. The method further includes the step of forming the camshaft as a unitary body.

A method of manufacturing a camshaft for a drum brake in accordance with another embodiment includes creating a three-dimensional model of the camshaft and converting the three-dimensional model into program instructions for an additive manufacturing machine. The method further includes successively depositing layers of material, responsive to the program instructions, using the additive manufacturing machine to form the camshaft. The camshaft comprises a unitary, tubular body defining a first end portion configured for coupling to a brake actuator, a second end portion defining a cam configured to engage cam followers coupled to first and second brake shoes, rotation of the cam causing the first and second brake shoes to move between positions of engagement and disengagement with an associated braking surface, and an intermediate portion disposed between the first and second end portions.

A method of manufacturing a plurality of different camshafts for a drum brake in accordance with one embodiment includes designing a first tubular camshaft having a first length and a second tubular camshaft having a second length different than the first length. Each of the first and second camshafts has a first end portion configured for coupling to a brake actuator. Each of the first and second camshafts further includes a second end portion defining a cam configured to engage cam followers coupled to first and second brake shoes. Rotation of the cam causes the first and second brake shoes to move between positions of engagement and disengagement with an associated braking surface. Each of the first and second camshafts further includes an intermediate portion disposed between the first and second end portions. A wall thickness of at least one of the first and second end portions and the intermediate portion of the first camshaft varies relative to a wall thickness of a corresponding one of at least one of the first and second end portions and the intermediate portion of the second camshaft and the first and second camshafts have the same torsional stiffness. The method further includes forming each of the first and second camshafts as a unitary body.

A method of manufacturing a camshaft for a drum brake in accordance with the present teachings represents an improvement as compared to conventional methods of manufacture. The inventive method produces a camshaft that is lighter than camshafts having a solid core as well as existing tubular camshafts. Further, the inventive method enables relatively simple configuration of the camshaft to establish a predetermined torsional stiffness of the camshaft and/or to dampen vibrations in the camshaft at selected frequencies.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
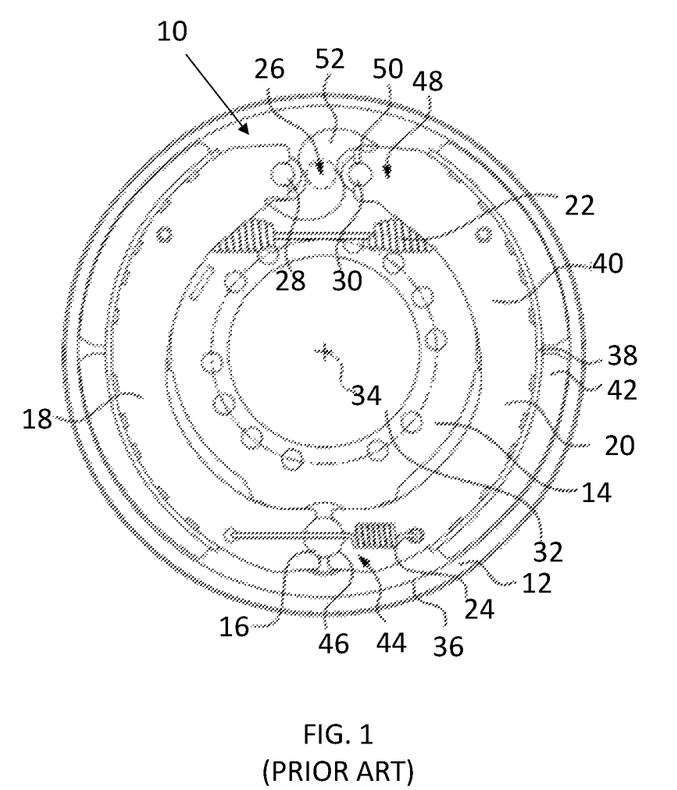
FIG. 1 is a side view of a prior art drum brake.

Referring now to the drawings wherein like reference numerals are used to identify identical components in the various views, FIG. 1 illustrates a drum brake 10. Brake 10 is particularly adapted for use in heavy vehicles. It should be understood, however, that brake 10 may be used on a wide variety of vehicles and in non-vehicular applications. Brake 10 is provided to slow rotation of one or more vehicle wheels. Brake 10 is configured to act against an annular brake drum 12 that rotates with the vehicle wheel or wheels at one end of an axle (not shown). Brake 10 may include a brake spider 14, one or more anchor pins 16, brake shoes 18, 20, return and retaining springs 22, 24, and means, such as camshaft 26 and rollers or cam followers 28, 30, for moving brake shoes 18, 20 between positions of engagement and disengagement with a braking surface.

Spider 14 is provided to mount the various components of brake 10. Spider 14 defines a central aperture 32 having a center axis 34 which may be coincident with the rotational axis of the vehicle wheel. The aperture 32 is configured to receive a vehicle axle extending therethrough and along axis 34. Spider 14 may further define apertures (not shown) on either side of aperture 32 configured to receive anchor pin 16 and camshaft 26.

Anchor pin 16 is provided to pivotally mount brake shoes 18, 20 to brake spider 14. Anchor pin 16 may comprise a round pin and may be mounted on and extend from brake spider 14. Although only a single anchor pin 16 is shown in the illustrated embodiment, it should be understood that brake shoes 18, 20 may be mounted on separate anchor pins 16 at some distance apart.

Brake shoes 18, 20 are provided for selective engagement with an associated braking surface 36 of drum 12 in order to apply a braking torque to drum 12 and one or more vehicle wheels. Brake shoes 18, 20 are supported on anchor pin(s) 16 and thereby pivotally coupled to spider 14 at one end. An opposite end of each brake shoe 18, 20 supports a corresponding cam follower 28, 30 and is configured to respond to a force applied by camshaft 26 on cam followers 28, that causes brake shoes 18, 20 to move between positions of engagement and disengagement with surface 36 in drum 12. Each brake shoe 18, 20 may include a brake table 38, one or more webs 40, and one or more brake linings 42.

Brake table 38 is provided to support brake linings 42. Table 38 is supported on webs and may be arcuate in shape. Table 38 may be made from conventional metals and metal alloys including steel.

Webs 40 support brake table 38. Webs 40 may also provide a connection point for return spring 22 and retaining spring 24. Webs 40 may be made from metals and metal alloys such as steel. Webs 40 are arcuate in shape and extend between opposite ends of brake shoes 18, 20. It should be understood that the number of webs 40 in each brake shoe 18, 20 may vary and each brake shoe 18, 20 may therefore include a plurality of webs 40 that extend generally parallel to one another. In conventional brake shoes, webs 40 may be secured to brake table 38 using welds or other conventional fastening means. Each web 40 may have one end 44 that is configured for pivotally coupling web 40 (and the corresponding brake shoe 18, 20) to brake spider 14. In particular, end 44 may define a semicircular recess 46 configured to receive a corresponding anchor pin 16 and allow web 44 to pivot about an axis extending through anchor pin 16. Each web 44 also may have a second end 48 that defines a semicircular recess 50 configured to receive and engage one of cam followers 28, 30 such that a force applied by camshaft 26 to cam followers 28, 30 causes the brake shoe 18, 20 to move between positions of engagement and disengagement with surface 36 in brake drum 12.

Brake linings 42 are provided for frictional engagement with braking surface 36 of drum 12. Linings 42 may be made from conventional friction materials. Brake linings 42 are disposed on brake table 38 and may be secured to brake table 38 using a plurality of rivets or other conventional fasteners including adhesives.

Return spring 22 is provided to bias brake shoes 18, 20 to a position of disengagement from the braking surface 36 of drum 14. Retainer springs 24 are provided to retain brake shoes 18, 20 on anchor pin(s) 16. Springs 22, 24 are conventional in the art. The ends of spring 22 may engage pins (not shown) extending from brake shoes 18, 20 while the ends of springs 24 extend through corresponding apertures in brake shoes 18, 20.

Camshaft 26, together with cam followers 28, 30, provide an actuating assembly or means for moving brake shoes 18, 20 between positions of engagement with and disengagement from the braking surface 36 of the drum 12. Camshaft 26 includes a shaft having one end defining a cam 52 engaging cam followers 28, 30 and an opposite end that may be coupled to a brake actuator through a conventional slack adjuster. The shaft extends through a camshaft aperture in spider 14 and is disposed about a rotational axis parallel to axis 34. Cam 52 may comprise a doubled lobed S-cam having a cam surface that is configured to engage cam followers 28, 30.

Cam followers 28, 30 are provided to transfer brake actuation forces from camshaft 26 to brake shoes 18, 20. Cam followers 28, 30 are circular in cross-section and are configured to be received within recesses 50 of webs 40. Cam followers 28, 30 engage webs 40 and camshaft 26 and follow the surface of the cam 52 as it rotates thereby causing shoes 18, 20 to pivot about a pivot axis defined at the center of anchor pin 16.

Conventional camshafts such as camshaft 26 in brake 10 have functioned well for their intended purpose. The camshafts typically have a solid core, however, and are relatively heavy. Tubular camshafts are known, but are typically manufactured in such a way that weight reduction cannot be optimized. Further, typical manufacturing processes do not facilitate easy configuration of the camshaft for the purpose of establishing a predetermined torsional stiffness of the camshaft and/or dampening vibrations in the camshaft at selected frequencies.

Figure 2:
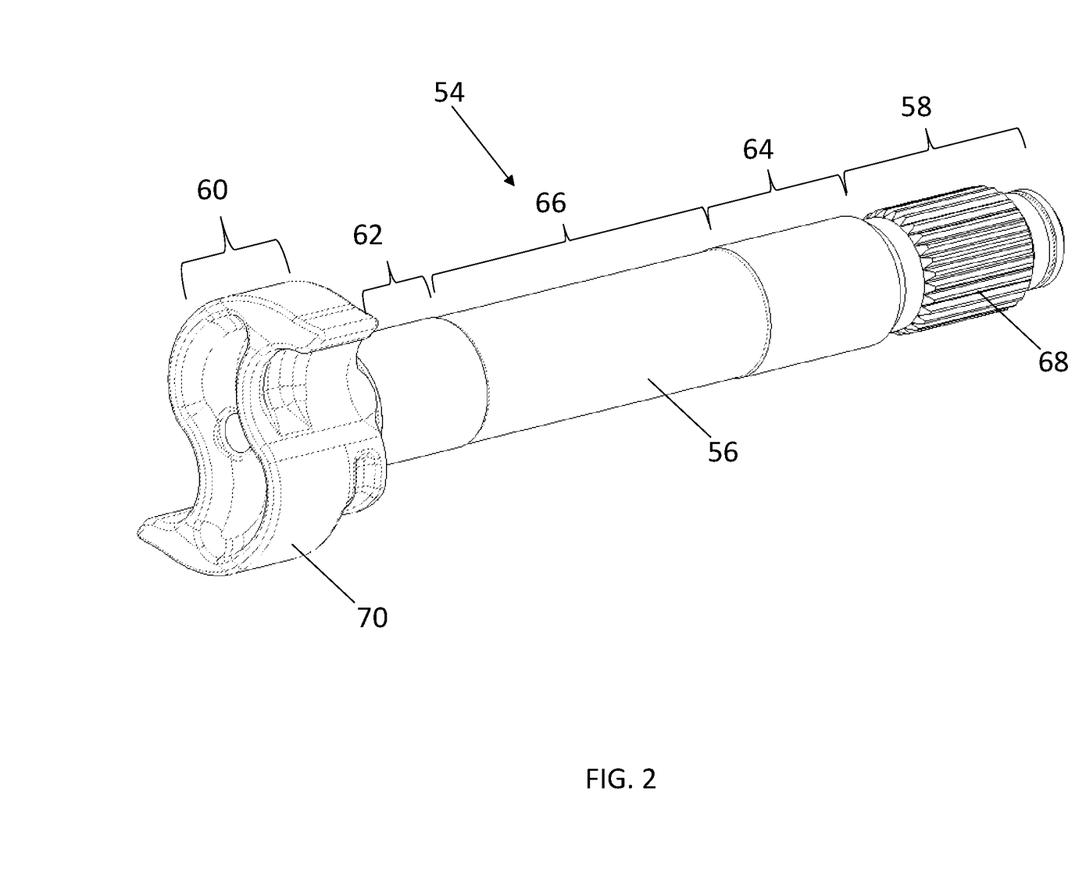
FIG. 2 is a perspective view of one embodiment of a camshaft for a drum brake in accordance with one embodiment of the present teachings.
Figure 3:
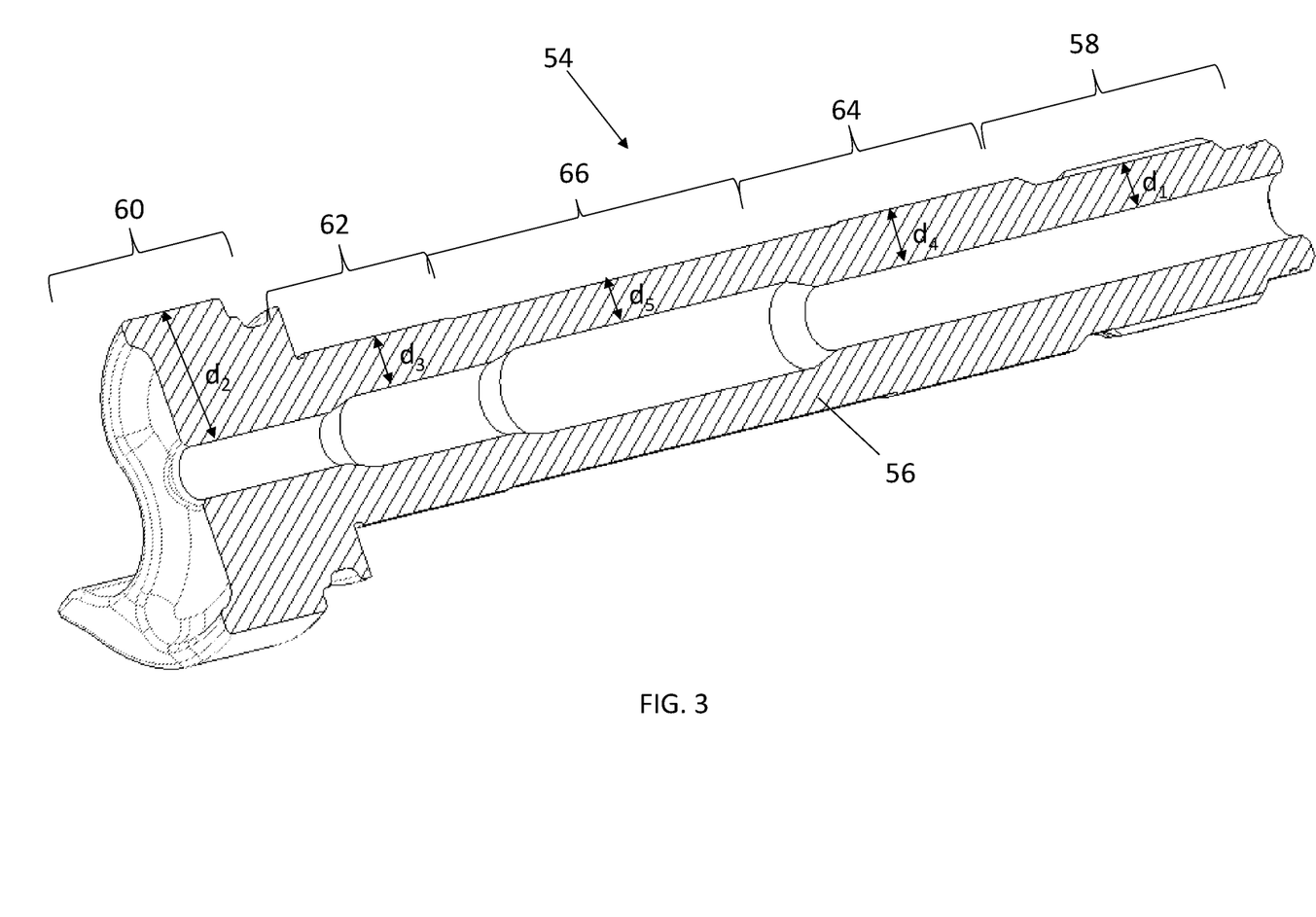
FIG. 3 is a cross-sectional view of the camshaft of FIG. 2.

Referring now to FIGS. 2 and 3, a camshaft 54 manufactured in accordance with the present teachings will be described. Like camshaft 26, camshaft 54 works together with cam followers 28, 30 to provide an actuating assembly or means for moving brake shoes 18, 20 between positions of engagement with and disengagement from the braking surface 36 of the drum 12. In accordance with one aspect of the present teachings, camshaft 54 has a unitary or one-piece body 56 such the body 56 is formed without any welds, adhesives, fasteners or other coupling means between portions of body 56. Body 56 may be made from conventional metals and metal alloys. Body 56 defines end portions 58, 60 at either longitudinal end of camshaft 54 and a plurality of intermediate portions 62, 64, 66 disposed between end portions 58, 60.

End portion 58 is configured for coupling to a brake actuator. Referring to FIG. 2, a radially outer surface of end portion 58 may define a plurality of splines 68. Splines 68 are configured to mesh with a corresponding plurality of splines on a driving worm wheel of a slack adjuster (not shown) that is, in turn, coupled to a brake actuator. The slack adjuster translates linear motion of a pushrod extending from the brake actuator into rotational movement of camshaft 54 to control the position of camshaft 54 and adjust the position to account for wear on brake linings 42. It should be understood that end portion 58 of camshaft 54 and the slack adjuster could alternatively be coupled through a key/keyway relationship or other conventional structures. Referring to FIG. 3, end portion 58 has a wall thickness $d_1$ as measured from inner diameter of portion 58 to an outer diameter defined midway between any two splines 68.

Referring again to FIG. 2, end portion 60 defines a cam 70. Cam 70 is configured to engage cam followers 28, 30 coupled to brake shoes 18, 20 such that rotation of cam 70 causes brake shoes 18, 20 to move between positions of engagement and disengagement with braking surface 36 in drum 12. Cam 70 may be configured as a double-lobed S-cam. Referring again to FIG. 3, end portion 60 has a wall thickness $d_2$ as measured from the inner diameter of portion 60 to an outer diameter defined at the surface of cam 70 engaging cam followers 28, 30.

Intermediate portions 62, 64 are configured to support bearings (not shown). Portion 62 is disposed proximate end portion 60 while portion 64 is disposed proximate end portion 58. In the illustrated embodiment, portion 62 is adjacent to portion 60 while portion 64 is adjacent to portion 58. It should be understood, however, that portions 62, 64 could be located at various locations along the length of camshaft 54 and need not be adjacent portions 60, 58, respectively. Further, it should be understood that there could be fewer or more than two bearing supporting intermediate sections. Intermediate portions 62, 64 have wall thicknesses $d_3$ and $d_4$, respectively, as measured from the inner diameter of portions 62, 64 to an outer diameter of portions 62, 64. The inner diameter of portion 62 is greater than the inner diameter of portion 60 in the illustrated embodiment, such that the inner diameter of camshaft 54 tapers moving from portion 62 to portion 60. The outer diameter of portion 62 is less than the outer diameter of portion 60 and wall thickness $d_3$ is less than wall thickness $d_2$. The inner diameter of portion 64 is equal to the inner diameter of portion 58 in the illustrated embodiment while the outer diameter of portion 64 is greater than the outer diameter of portion 58 such that the outer diameter of camshaft 54 tapers moving from portion 64 to portion 58 and the wall thickness $d_4$ of portion 64 is greater than the wall thickness $d_1$ of portion 58. The wall thicknesses $d_3$, $d_4$ of portions 62, 64 may be equal, but may also vary from one another.

Intermediate portion 66 represents a portion of camshaft 54 that is not subjected to radial loads. Unlike portions 58, 60, 62, 64, portion 66 is not subjected to radial loads from, for example, a slack adjuster, brake shoes, or bearings. In the illustrated embodiment, camshaft 54 includes a single portion 66 that is not subjected to radial loads between load-bearing intermediate portions 62, 64. It should be understood, however, that camshaft 54 may have more than one defined portion that is not subject to radial loads. These portions may be adjacent to one another or separated by load bearing portions of camshaft 54. Intermediate portion 66 has a wall thickness $d_5$ measured from an inner diameter of portion 66 to an outer diameter of portion 66. In the illustrated embodiment, the inner diameter of portion 66 is greater than the inner diameter of portions 62, 64 such that the inner diameter of camshaft 54 tapers moving from portion 66 to either of portions 62, 64. The outer diameter of portion 66 is less than the outer diameter of portions 62, 64 such that the outer diameter of camshaft 54 tapers moving form portions 62, 64 to portion 66. The wall thickness $d_5$ of portion 66 may be less than the wall thicknesses $d_1$, $d_2$, $d_3$, $d_4$ of any of portions 58, 60, 62, 64.

In accordance with one aspect of the present teachings, one or more of the wall thicknesses $d_1$, $d_2$, $d_3$, $d_4$, $d_5$ of portions 58, 60, 62, 64, 66 of camshaft 54 may be configured to achieve a predetermined torsional stiffness in camshaft 54 and/or dampen vibrations in camshaft 54 at selected frequencies. In general, camshafts are subjected to increasing torsional displacement as the length of the camshaft increases. For example, in one constructed model, three camshafts having lengths of 10.687 inches, 12.687 inches and 14.687 inches and a constant wall thickness of inches experienced torsional displacement of 0.0265 inches, 0.0317 inches and 0.0369 inches, respectively, in the presence of an 18000 lbf-in torque load. In order to restrict torsional displacement, it is desirable to maintain at least a minimum level of torsional stiffness in the camshaft. In accordance with one aspect of the present teachings, the wall thickness $d_1$, $d_2$, $d_3$, $d_4$, $d_5$ of one or more portions 58, 60, 62, 64, 66 of camshaft 54 is selected to maintain a predetermined torsional stiffness. As a result, torsional displacement remains the same despite variation in the length of the camshaft. In the model described above, the camshafts having lengths of 10.687 inches, 12.687 inches and 14.687 inches were modeled with varying wall thicknesses $d_5$ of 0.17 inches, 0.275 inches and 0.378 inches, respectively, in intermediate portion 66 resulting in the same torsional stiffness and a constant torsional displacement of 0.0369 inches for all three camshafts in the presence of the 18000 lbf-in torque load. Using computer modeling, a functional relationship can be developed relating to camshaft length to wall thickness $d_1$, $d_2$, $d_3$, $d_4$, $d_5$ in one or more portions 58, 60, 62, 64, 66 of camshaft 54 enabling manufacture of a single camshaft 54 having a predetermined torsional stiffness or a family of camshafts 54 having different lengths, but the same torsional stiffness. In this manner, one variable associate with the design and operation of braking systems and vehicles generally can be eliminated. The wall thickness $d_1$, $d_2$, $d_3$, $d_4$, $d_5$ in one or more portions 58, 60, 62, 64, 66 of camshaft 54 may also be varied to dampen vibrations in camshaft 54 at selected frequencies. A camshaft, like other components of brake 10 and a vehicle containing brake 10, has one or more natural frequencies at which the camshaft oscillates in the absence of any external forces. Depending on the external forces applied to camshaft 54 and the natural frequencies of other brake and vehicle components, camshaft 54 may resonate at one of its natural frequencies. By adjusting the thickness $d_1$, $d_2$, $d_3$, $d_4$, $d_5$ in one or more portions 58, 60, 62, 64, 66 of camshaft 54, vibration of the camshaft 54 at the selected frequency can be dampened. Again, using computer modeling, a functional relationship can be developed relating wall thickness $d_1$, $d_2$, $d_3$, $d_4$, $d_5$ in one or more portions 58, 60, 62, 64, 66 of camshaft 54 to changes in natural frequencies of camshaft 54 enabling manufacture of a camshaft with vibration damping at selected frequencies.

Because portion 66 does not bear any radial loads, a manufacturer may choose to vary the wall thickness $d_5$ of portion 66 to achieve a predetermined torsional stiffness for camshaft 54 and/or attenuate a predetermined natural frequency of camshaft 54. It should be understood, however, that the wall thicknesses $d_1$, $d_2$, $d_3$, $d_4$ of any of portions 58, 60, 62, 64 may also or alternatively be varied to achieve the predetermined torsional stiffness and/or attenuate the natural frequency. It should also be understood that the wall thicknesses $d_1$, $d_2$, $d_3$, $d_4$, $d_5$ of more than one portion 58, 60, 62, 64, 66 may be varied to achieve the predetermined torsional stiffness and/or attenuate the natural frequency. In accordance with one aspect of the present teachings, the wall thicknesses $d_1$, $d_2$, $d_3$, $d_4$, $d_5$ of one or more portions 58, 60, 62, 64, 66 of camshaft 54 may be varied such that predetermined torsional stiffness is obtained despite changes in length of camshaft 54. In this manner, the manufacturer can offer a family of camshafts of varying length having the same predetermined torsional stiffness.

Figure 4:
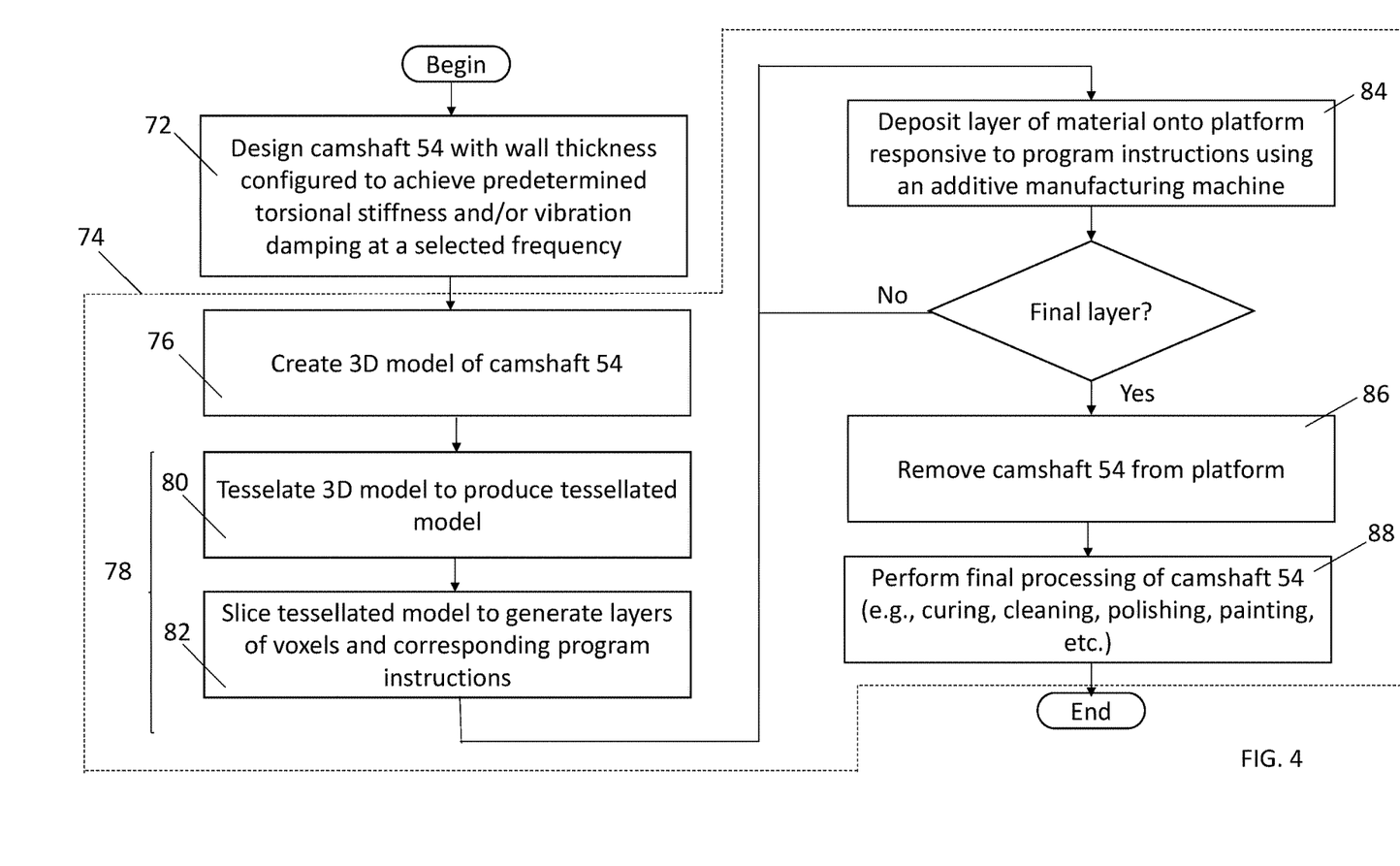
FIG. 4 is a flowchart diagram illustrating steps in a method for manufacturing a camshaft for a drum brake in accordance with one embodiment of the present teachings.

Referring now to FIG. 4, in accordance with one aspect of the present teachings, a method of manufacturing camshaft 54 may begin with the step 72 of designing a tubular camshaft 54 including an end portion 58 configured for coupling to a brake actuator, an end portion 60 defining a cam 70 configured to engage cam followers 28, 30 coupled to brake shoes 18, 20 and one or more intermediate portions 62, 64, 66 disposed between the end portions 58, 60. In accordance with one aspect of the present teachings, camshaft 54 is designed such that a wall thickness $d_1$, $d_2$, $d_3$, $d_4$, $d_5$ of at least one of the portions 58, 60, 62, 64, 66 is configured to achieve at least one of a predetermined torsional stiffness in camshaft 54 and vibration damping in camshaft 54 at a selected frequency.

The method may continue with the step 74 of forming the camshaft 54 as a unitary body 56 without any welds, adhesives, fasteners or other coupling means between portions of body 56. In accordance with a preferred embodiment, the forming step 74 may include several substeps to implement an additive manufacturing process. In particular, the forming step 74 may include the substep 76 of creating a three-dimensional model of camshaft 54. The model may be created using computer aided design (CAD) software. The method may continue with the step 78 of converting the three-dimensional model into program instructions for an additive manufacturing machine. Step 78 may include several substeps 80, 82 including tessellating the model to produce a stereolithography or standard tessellation language (.STL) file with a tessellated model and slicing the tessellated model into multiple slices or layers of voxels to generate program instructions for the additive manufacturing machine in a numerical control programming language (e.g., G-code). Each of substeps 80, 82 may be performed using conventional software such as the software marketed under the trademark "CADFIX" by International Techne-Group Inc. of Milford, Ohio. Once the program instructions are provided to the additive manufacturing machine, the method may continue with the step 84 of successively depositing layers of material (e.g., metal powder), responsive to the program instructions, using the additive manufacturing machine to form camshaft 54. The camshaft 54 is formed by the machine on a platform and, once the final layer is deposited, the method may continue with the steps 86, 88 of removing camshaft 54 from the platform and, if necessary, performing final processing steps such as curing, cleaning, polishing, painting, etc.

In accordance with another embodiment, the forming step 74 may include several substeps to implement a sand casting process. In particular, the forming step 74 may include the substeps of forming a mold or pattern for the camshaft 54 and placing the mold or pattern within a multi-part container (e.g. a container with two halves). The forming step 74 may further include the substeps of closing the container, placing sand within the container around the mold or pattern, opening the container, removing the mold or pattern from the container, clamping the container shut and pouring material (e.g., molten metal) into the container through a sprue hole and into the cavity in the sand formed by the mold or pattern. The forming step 74 may further include the substeps of opening the container after the poured material has hardened and cooled, and removing the sand from around the camshaft 54. The forming step 74 may further include machining the camshaft 54 to achieve desired tolerances or surface finishes.

In accordance with another embodiment, the forming step 74 may include several substeps to implement a diecasting process. In particular, the forming step 74 may include the substeps of forming a several molds or dies, joining the molds or dies within a diecasting machine to establish a cavity in the form of camshaft 54, and injecting a material such as a molten metal (e.g., aluminum) into the cavity. The forming step 74 may further include the substeps of separating the molds or dies once the material has hardened and cooled and removing the formed camshaft 54.

In accordance with another embodiment, the forming step 74 may include several substeps to implement an investment casting process. In particular, the forming step 74 may include the substeps of creating a wax pattern of the camshaft 54 and coating the wax pattern with a liquid refractory ceramic material. The forming step 74 may further include the substep of heating the pattern, after the ceramic material has hardened, to melt the wax, leaving a hollow ceramic mold. The forming step 74 may further include the substeps of pouring a material such as a molten metal into the ceramic mold and, once the metal solidifies into a metal casting of the camshaft 54, breaking the ceramic mold to retrieve the metal casting.

In accordance with another aspect of the present teachings, the above-described method may be used to manufacture a plurality of different camshafts for a drum brake having the same torsional stiffness. In particular, two camshafts 54 that are identical except for having a different length would normally have a different torsional stiffness. By varying the wall thickness of one or more corresponding portions of the camshafts 54, however, the two camshafts 54 can be designed to have the same torsional stiffness despite the difference in length. Thus, a method of manufacturing a plurality of different camshafts 54 for a drum brake may again begin with the step 72 of designing two or more tubular camshafts 54 of different length with each camshaft 54 including an end portion 58 configured for coupling to a brake actuator, an end portion 60 defining a cam 70 configured to engage cam followers 28, 30 coupled to brake shoes 18, 20 and one or more intermediate portions 62, 64, 66 disposed between the end portions 58, 60. In accordance with one aspect of the present teachings, the wall thickness $d_1$, $d_2$, $d_3$, $d_4$, $d_5$ of one or more corresponding portions 58, 60, 62, 64, 66 in the camshafts 54 is varied to achieve the same predetermined torsional stiffness despite differences in the length of the camshafts. The method may again conclude with the step 74 of forming each of the camshafts 54 as a unitary body. The forming step 74 may be performed using any of the additive manufacturing, sand casting, die casting or investment casting methods described hereinabove.

A method of manufacturing a camshaft 54 for a drum brake 10 in accordance with the present teachings represents an improvement as compared to conventional methods of manufacture. The inventive method produces a camshaft 54 that is lighter than camshafts having a solid core as well as existing tubular camshafts. Further, the inventive method enables relatively simple configuration of the camshaft to establish a predetermined torsional stiffness of the camshaft 54 and/or to dampen vibrations in the camshaft 54 at selected frequencies.

While the invention has been shown and described with reference to one or more particular embodiments thereof, it will be understood by those of skill in the art that various changes and modifications can be made without departing from the spirit and scope of the invention.

What is claimed is:

1. A method of manufacturing a camshaft for a drum brake, comprising:
    forming a tubular camshaft having
        a first end portion configured for coupling to a brake actuator,
        a second end portion defining a cam configured to engage cam followers coupled to first and second brake shoes, rotation of the cam causing the first and second brake shoes to move between positions of engagement and disengagement with an associated braking surface;
        a first intermediate portion disposed between the first and second end portions;
        a second intermediate portion between the first intermediate portion and one of the first end portion and the second end portion, the second intermediate portion configured to support a first bearing; and,
        a third intermediate portion between the first intermediate portion and the other of the first end portion and the second end portion, the third intermediate portion configured to support a second bearing,
    wherein a wall thickness of at least one of the first and second end portions and the first intermediate portion is configured to achieve at least one of a predetermined torsional stiffness in the camshaft and vibration damping in the camshaft at a selected frequency; wherein a wall thickness of the second intermediate portion is greater than a wall thickness of the first intermediate portion; and,
    forming the camshaft as a unitary body.

2. The method of manufacturing of claim 1 wherein a wall thickness of the third intermediate portion is greater than the wall thickness of the first intermediate portion.

3. The method of manufacturing of claim 1 wherein the forming step includes forming the camshaft through one of additive manufacturing, sand casting, die casting and investment casting.

4. The method of manufacturing of claim 1 wherein the forming step includes the substeps of:
    creating a three-dimensional model of the camshaft;
    converting the three-dimensional model into program instructions for an additive manufacturing machine; and,
    successively depositing layers of material, responsive to the program instructions, using the additive manufacturing machine to form the camshaft.

* * * * *